(12) United States Patent  (10) Patent No.: US 7,024,088 B1
Davis  (45) Date of Patent: Apr. 4, 2006

(54) COLOR CODING SYSTEM FOR FIBEROPTIC CABLES AND ILLUMINATOR CABLE PORTS

(76) Inventor: James M. Davis, 4424 Corporate Square Dr., Naples, FL (US) 34104

( * ) Notice: Subject to any disclaimer, the term of this patent is extended or adjusted under 35 U.S.C. 154(b) by 0 days.

(21) Appl. No.: 10/740,992

(22) Filed: Dec. 16, 2003

Related U.S. Application Data

(60) Provisional application No. 60/433,793, filed on Dec. 16, 2002.

(51) Int. Cl.
  *G02B 6/00* (2006.01)
  *H01R 3/00* (2006.01)
(52) U.S. Cl. .................................... 385/135; 439/488
(58) Field of Classification Search ............... 385/135, 385/92, 147; 439/488, 490
  See application file for complete search history.

(56) References Cited

U.S. PATENT DOCUMENTS

| 4,875,753 | A | * | 10/1989 | Kalomiris ..................... 385/56 |
| 5,394,503 | A | * | 2/1995 | Dietz et al. ................. 385/135 |
| 5,775,935 | A | * | 7/1998 | Barna ......................... 439/488 |
| 6,104,371 | A | * | 8/2000 | Wang et al. ................ 345/102 |
| 6,234,829 | B1 | * | 5/2001 | Thomsen .................... 439/488 |
| 6,370,304 | B1 | * | 4/2002 | Mills et al. ................. 385/114 |
| 6,431,765 | B1 | * | 8/2002 | Chen et al. .................. 385/92 |

* cited by examiner

*Primary Examiner*—Chandrika Prasad
(74) *Attorney, Agent, or Firm*—William E. Noonan

(57) ABSTRACT

A color coding system is provided for multiple port fiberoptic illuminators and corresponding fiberoptic cables. A first color indicator is mounted to the illuminator proximate each illuminator port. Each first color indicator has a distinctive coloration. A like plurality of distinctly colored second color indicators are carried by the respective cables that correspond to the ports.

13 Claims, 4 Drawing Sheets

COLOR CODING SYSTEM FOR FIBEROPTIC CABLES AND ILLUMINATOR CABLE PORTS

RELATED APPLICATION

This application claims the benefit of U.S. Provisional Application Ser. No. 60/433,793, filed Dec. 16, 2002.

FIELD OF THE INVENTION

This invention relates to a system for color coding fiberoptic cables and the corresponding cable ports of a fiberoptic illuminator that receive those cables.

BACKGROUND OF THE INVENTION

Fiberoptic illuminators are often designed to accept and operate with various types of standard fiberoptic cables. A number of manufacturers presently provide such cables. Conventional illuminators often employ a rotatable turret having a plurality of ports. Each port is configured to accept the end fitting of a corresponding brand of cable.

Currently, it is very difficult to determine at a glance which illuminator cable port will accept a particular type of cable end fitting. As a result, time delays are experienced when medical personnel attempt to attach a particular cable to the correct port of the illuminator turret. Such delays are especially likely when untrained personnel are utilizing the equipment. Complicating the situation is the fact that the illuminator port and/or the cable end fitting may be damaged when the personnel attaching the cable attempts to force the cable's end fitting into an incorrect non-matching port. This can necessitate expensive equipment repairs. The illuminator and the cable may be unavailable for an extended period, which can cause serious inconvenience to the hospital, clinic or doctor's office owning the equipment. Medical personnel can also be injured when improperly attempting to force a cable end fitting into a non-mating illuminator port.

SUMMARY OF INVENTION

It is therefore an object of this invention to provide a system for color coding fiberoptic cable end fittings and the corresponding cable ports of a fiberoptic illuminator so that a selected cable end fitting can be quickly and reliably engaged with the correct illuminator cable port.

It is a further object of this invention to provide a color coding system for fiberoptic cables and corresponding illuminator cable ports that reduces the potential for equipment damage caused by attempting to force a cable end fitting into an incorrect illuminator cable port.

It is a further object of this invention to provide a color coding system that enables fiberoptic cables to be operably engaged with fiberoptic illuminator much more quickly than has heretofore been possible so that operating room delays are reduced.

It is a further object of this invention to provide a color coding system that significantly reduces the cost that has been required to repair illuminators damaged by improperly attempting to insert cable end fittings into incorrect, non-matching cable ports of an illuminator.

It is a further object of this invention to provide a color coding system for fiberoptic illuminator cable ports and corresponding fiberoptic cables that enables even untrained medical personnel to quickly and accurately attach a cable to its corresponding illuminator cable port.

It is a further object of this invention to provide a color coding system that reduces the injury caused to medical personnel by attempting to insert a fiberoptic cable into an incorrect illuminator cable port.

The invention features a color coding system for the cable ports of a multiple port fiberoptic illuminator and the cable end fittings that correspond with such ports. The system includes a plurality of first color indicators. Each first color indicator has a distinct color and is associated with a respective cable port of the illuminator. The color indicator is mounted in the illuminator turret proximate a respective cable port. The system further includes a like plurality of second color indicators. Each of the second color indicators includes a distinct color that matches one of the indicators in the first plurality of color indicators. Each of the second color indicators is attached to at least one of the cable body or the cable end fitting of a corresponding selected fiberoptic cable. Each fiberoptic cable end fitting is releasably engagable with a corresponding one of the illuminator cable ports such that the first color indicator adjacent that port matches the color of the second color indicator carried by the cable engaged with the port.

In a preferred embodiment, the first color indicators comprise buttons that are received in respective holes pre-bored in the cable ports. The second color indicators may comprise shrink-wraps that are carried by the respective cable end fittings. Alternatively, the second color indicators may comprise colored sheathing that is attached to each of the cables.

DETAIL DESCRIPTION OF PREFERRED EMBODIMENTS

Other objects, features and advantages will occur from the following description of preferred embodiments and the accompanying drawings, in which.

Figure 1:
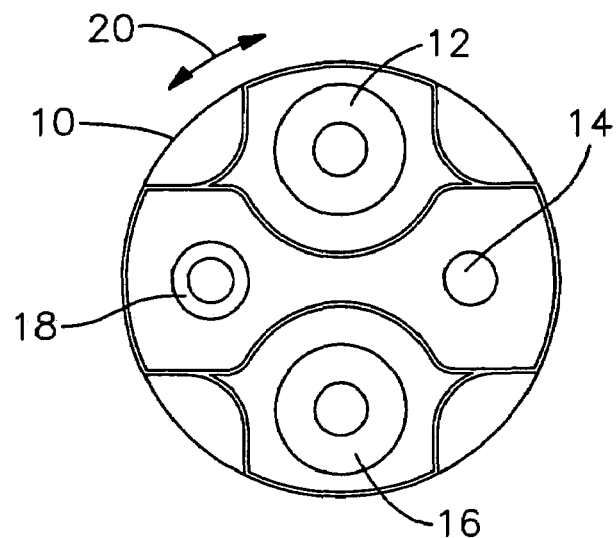
FIG. 1 is an elevational view of a four-port turret in a fiberoptic illuminator utilizing the color coding system of this invention; the turret is depicted with one of the ports (i.e. the port at 12 o'clock) in a position for operably receiving a corresponding fiberoptic cable.

There is shown in FIG. 1 a rotatable turret 10 of the type used in various fiberoptic illuminators. Such illuminators are widely employed in the medical field and in other applications. The body of the illuminator is conventional and not described herein. Turret 10 includes four ports 12, 14, 16 and 18. Each port has a configuration that is designed to receive a corresponding end fitting of a standard fiberoptic cable in a generally mating fashion. It is well known in the art that illuminator ports or receptacles are configured to receive a single brand or type of mating cable end fitting. These may include, for example, end fittings manufactured by Wolfe, ACMI, Stores and Olympus. Various other manufacturers' end fittings and corresponding illuminator ports may also be employed within the scope of this invention. The particular manufacturers involved are not a limitation of the invention.

It will also be understood by persons skilled in the art that turret 10 is adjusted by rotating it in the direction indicated by double-headed arrow 20. The turret is rotated to position a selected one of the cable ports 12–18 at the 12 o'clock position or at an alternative position such that the selected port is aligned with the light source within the illuminator. When the cable end fitting is engaged with this aligned port, light is provided through the cable to a surgical head lamp or other fiberoptic illuminating appliance.

Figure 2:
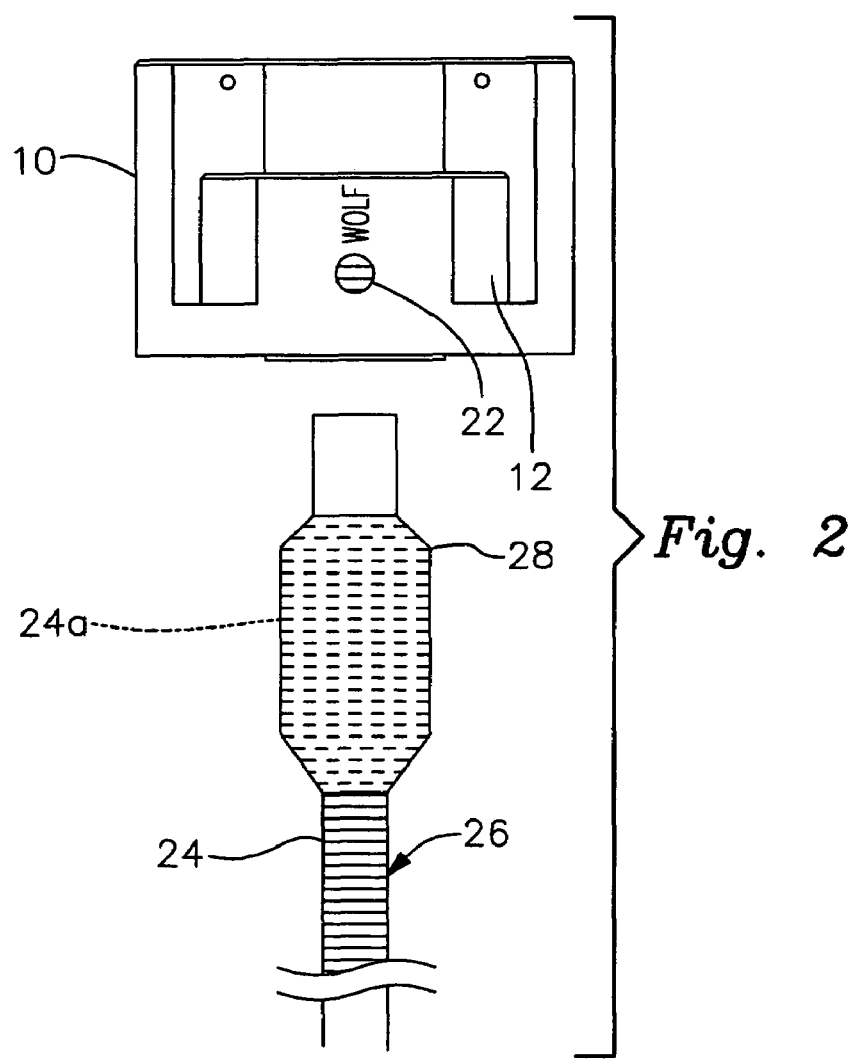
FIG. 2 is a top plan view of the port and its corresponding cable; the port and the cable employ matching blue indicators according to the color coding system of this invention.

As shown in FIG. 2, a first color indicator comprising a blue button 22 is positioned proximate receptacle or opening 12. Likewise, a matching second blue indicator comprising blue sheathing 24 is carried by corresponding cable 26. In alternative embodiments, the second color indicator may include a matching blue shrink-wrap 24a, shown in phantom, that is applied to end fitting 28 of cable 26. In either event, the matching blue color of button 22 and sheathing 24 (or shrink-wrap 24a) enables medical personnel to quickly and accurately ascertain that cable 26 is properly engaged with matching port 12. This particular cable will not be mistakenly inserted into one of the other non-matching ports. Damage to the illuminator and/or to the cable is thereby avoided.

It should be understood that button 22 may be attached to turret 10 proximate port 12 in various manners. For example, a prebored hole may be formed in the turret proximate the entrance of port 12. This hole is provided with a diameter and design that are selected to accept the button and hold the button in place. The customer may select the particular color to be used for the button. Button 22 is inserted into the hole and is snapped permanently in place. A matching color is then employed in connection with cable 26.

Figure 3:
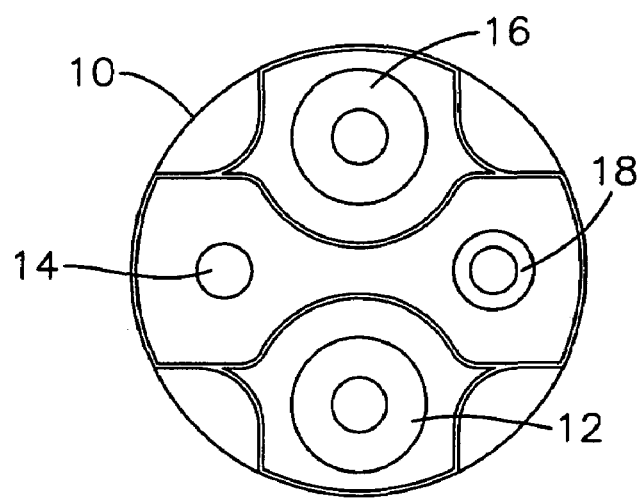
FIG. 3 is a front elevational view of the turret with a second one of the ports in the operative position.
Figure 4:
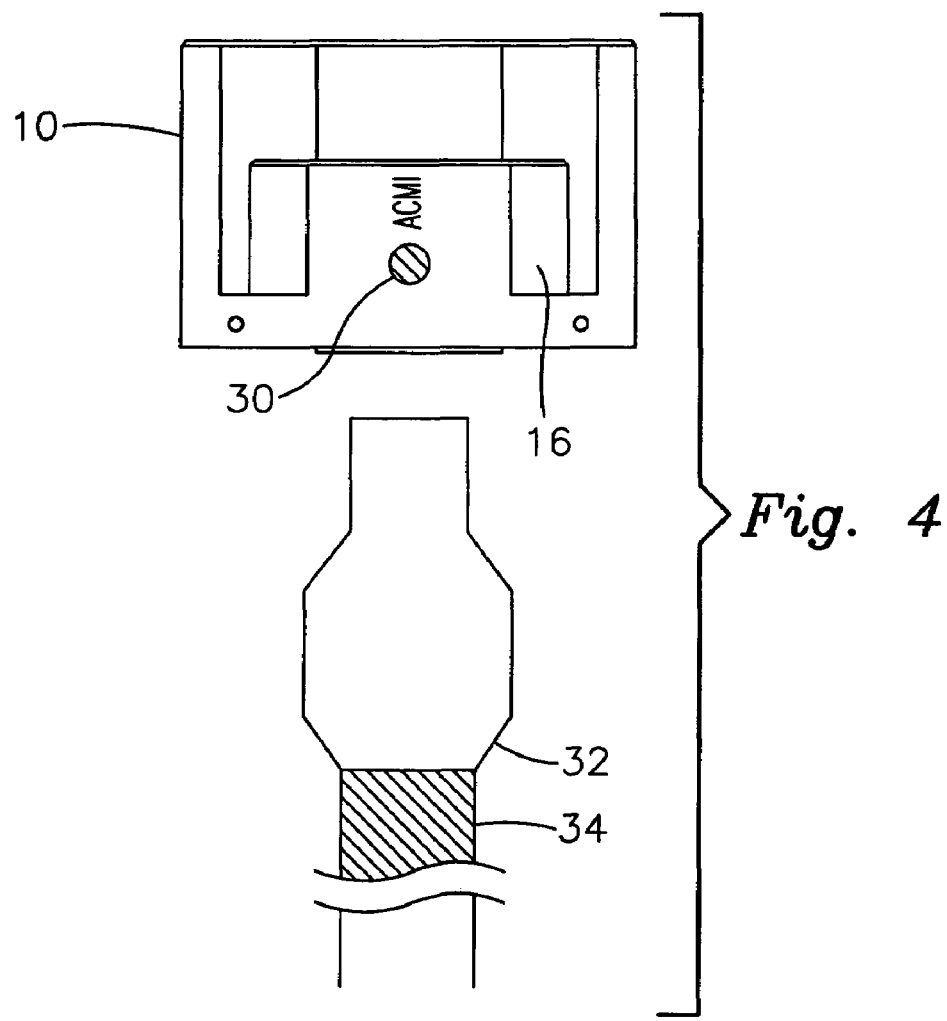
FIG. 4 is a view similar to FIG. 2 of the operating port and its corresponding cable, each of which includes a matching green indicator.

The remaining drawings depict the buttons and matching sheathing used for the remaining illuminator ports and corresponding cables. For example, in FIG. 3 illuminator port 16 is depicted at the 12 o'clock position. A green button 30 is positioned proximate the opening of port 16. This button is constructed and installed in a manner to that previously described for button 22. Second cable 32, which is an alternative brand of cable (i.e. different from cable 26 and employing a differently shaped end fitting), employs a green sheathing 34 that matches the color of button 30. The user can thereby quickly and accurately determine that cable 34 is properly connected to port 16.

Figure 5:
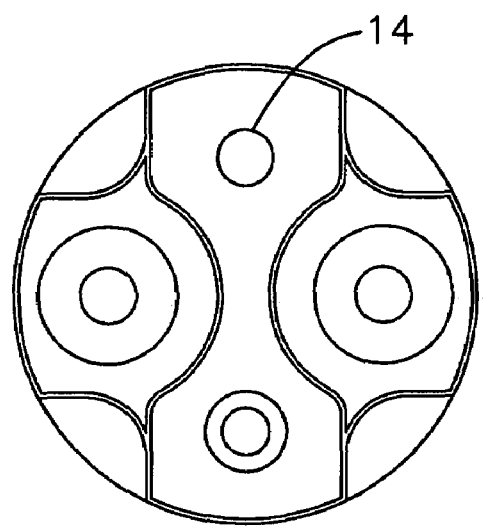
FIG. 5 is a front elevational view of the turret with a third one of the ports in the operative position.
Figure 6:
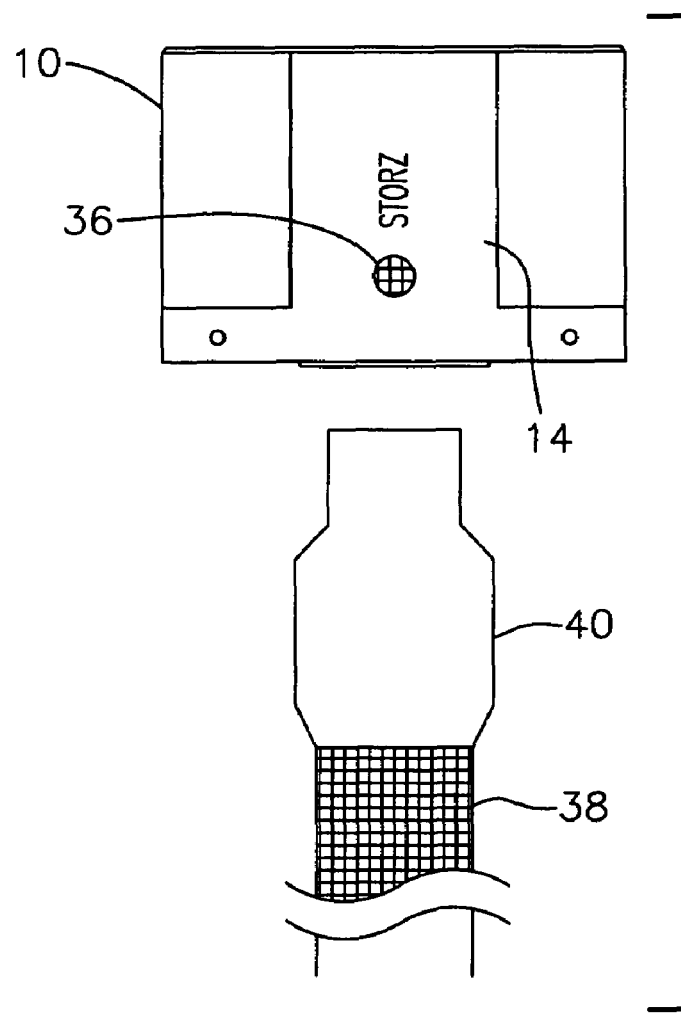
FIG. 6 is a top plan view of a the operative port and its corresponding cable utilizing matching yellow color indicators.

FIG. 5 illustrates port 14 in the operative position. A yellow button 36 is mounted within turret 10 proximate port 14 (FIG. 6). This button matches the color of sheathing 38 carried by corresponding cable 40. The matching yellow colors enable the user to properly connect cable 38 with its corresponding receptacle 14.

Figure 7:
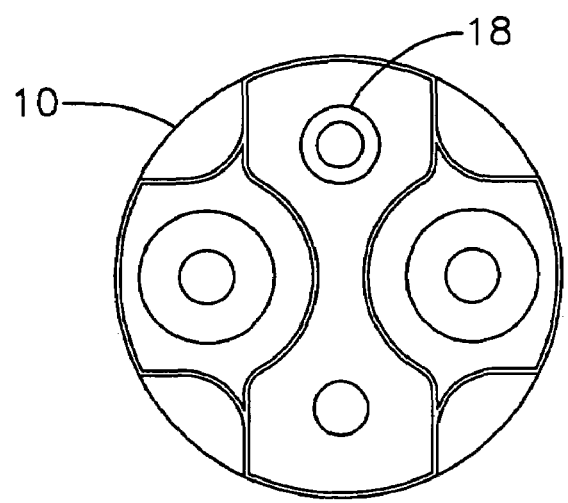
FIG. 7 is a front elevational view of the turret with the fourth port in operative position.
Figure 8:
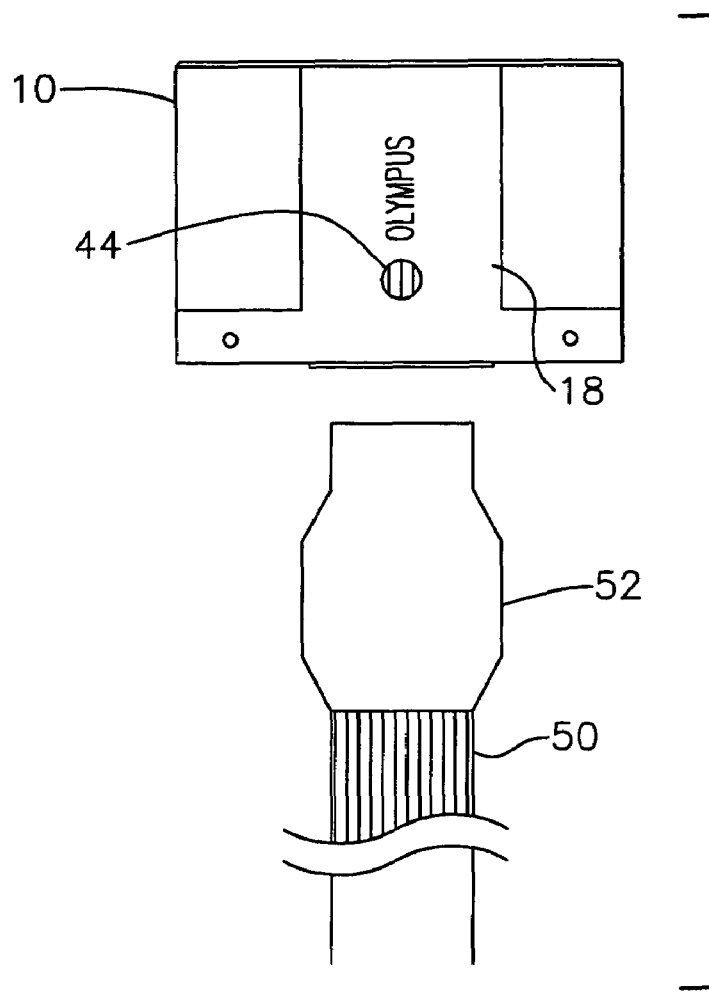
FIG. 8 is a top plan view of the operative port and its corresponding cable, each of which employs a matching red color indicator.

Finally, turret 10 is shown with port 18 in the operative position in FIG. 7. A red button 44 is depicted mounted within turret 10 proximate the opening of port 18. This red color matches the red sheathing 50 carried by corresponding cable 52.

In each of the cable ports and corresponding cables, the construction and installation of the first and second color indicators is accomplished in an analogous manner to that described above. In each cable, shrink-wrap or some other type of second color indicator may be employed on the cable, as previously describe for cable 26.

Although specific features of the invention are shown in some of the drawings and not others, this is for convenience only, as each feature may be combined with any and all of the other features in accordance with this invention.

What is claimed:

1. A color-coded fiberoptic illumination system comprising:
   a multiple port fiberoptic illuminator including a rotatable turret having a circumferential surface facing radially outwardly from said turret for revolving about the rotational axis of said turret as said turret rotates and a plurality of light-transmitting ports that extend through said turret interiorly of said circumferential surface, each port having a longitudinal axis that is parallel to the rotational axis of said turret, said turret being rotated to position a selected one of said ports in operative alignment with a light source of said illuminator;
   a like plurality of fiberoptic cables, each cable being selectively engagable exclusively with a single respective port, each cable including a cable body and an end fitting that is releasably engagable with the respective port;
   a plurality of first color indicators, each having a distinct color that is different from the color of each other first color indicator, each said first color indicator carried by said circumferential surface of said turret adjacent to and exteriorly of an associated illuminator port and directed radially outwardly from said circumferential surface at a substantially perpendicular angle to the longitudinal axis of said associated port and being associated with that port exclusively to identify the associated port and distinguish that port from the other ports of the illuminator; and
   a like plurality of second color indicators, each having a distinct color that is different from the color of each other second color indicator and that matches the color of a single one of said first color indicators, each second color indicator for being carried by at least one of the cable body and end fitting of the respective fiberoptic cable engagable with the port identified by the matching color of said first color indicators, whereby a selected cable's second color indicator is color matched with a single one of the first color indicators to identify the respective illuminator port that is operably engagable by that cable.

2. The system of claim 1 in which said first color indicators comprise buttons mountable in respective holes pre-bored in the circumferential surface of said turret.

3. The system of claim 1 in which said second color indicators comprise distinctively colored shrink wraps for being carried by the respective cable end fittings.

4. The system of claim 1 in which said second color indicators comprise distinctively colored sheathing attached to the respective cable bodies.

5. The system of claim 1 in which said first color indicators comprise buttons embedded in said circumferential surface of said turret and directed radially outwardly from said turret at a substantially perpendicular angle to the longitudinal axes of said ports.

6. A color-coded fiberoptic illumination system comprising:
   a multiple port fiberoptic illuminator including a rotatable turret having a circumferential surface facing radially outwardly from said turret for revolving about the rotational axis of said turret as said turret rotates and a plurality of light-transmitting ports that extend through said turret interiorly of said circumferential surface, each port having a longitudinal axis that is parallel to the rotational axis of said turret;

a like plurality of fiberoptic cables, each cable being selectively engagable exclusively with a single respective port, each cable including a cable body and an end fitting that is releasably engagable with the respective port;

a plurality of first color indicators, each having a distinct color that is different from the color of each other first color indicator, each said first color indicator carried by said circumferential surface of said turret adjacent to and exteriorly of an associated illuminator port, each first color indicator being spaced apart circumferentially from each other first color indicator, each first color indicator directed radially outwardly from said circumferential surface at a substantially perpendicular angle to the longitudinal axis of said associated port and being associated with that port exclusively to identify the associated port and distinguish that port from the other ports of the illuminator;

said turret being rotated to position a selected one of said ports at a twelve o'clock position in operative alignment with a light source of said illuminator, said first color indicator associated with said selected port being visible and exposed exclusively of the other first color indicators to a person viewing said circumferential surface of said turret from a position directly above said circumferential surface to indicate that said port associated with said exposed first color indicator is operatively aligned with said light source, whereby said selected port is identified without necessarily being visible to such person; and a like plurality of second color indicators, each having a distinct color that is different from the color of each other second color indicator and that matches the color of a single one of said first color indicators, each second color indicator for being carried by at least one of the cable body and end fitting of the respective fiberoptic cable engagable with the port identified by the matching color of said first color indicators, whereby a selected cable's second color indicator is color matched with a single one of the first color indicators to identify the respective illuminator port that is operably engagable by that cable.

7. The system of claim 6 in which said first color indicators comprise buttons mountable in respective holes pre-bored in the circumferential surface of said turret.

8. The system of claim 6 in which said first color indicators comprise buttons embedded in said circumferential surface of said turret and directed radially outwardly from said turret at a substantially perpendicular angle to the longitudinal axes of said ports.

9. The system of claim 2 in which said holes have radial axes that are perpendicular to the longitudinal axes of said ports.

10. The system of claim 8 in which said holes have radial axes that are perpendicular to the longitudinal axes of said ports.

11. The system of claim 1 in which each first color indicator is spaced apart circumferentially on said turret from each other first color indicator.

12. The system of claim 6 wherein said first color indicators are positioned at ninety degree intervals about said circumferential surface of said turret.

13. The system of claim 10 wherein said first color indicators are positioned at ninety degree intervals about said circumferential surface of said turret.

* * * * *